United States Patent [19]

Panwar

[11] Patent Number: 5,860,018
[45] Date of Patent: Jan. 12, 1999

[54] METHOD FOR TRACKING PIPELINE RESOURCES IN A SUPERSCALAR PROCESSOR

[75] Inventor: Ramesh Panwar, Santa Clara, Calif.

[73] Assignee: Sun Microsystems, Inc., Palo Alto, Calif.

[21] Appl. No.: 881,240

[22] Filed: Jun. 25, 1997

[51] Int. Cl.[6] .................................................. G06F 9/38
[52] U.S. Cl. ........................ 395/800.23; 395/674
[58] Field of Search .............................. 395/800.23, 390, 395/392, 674

[56] References Cited

U.S. PATENT DOCUMENTS

| | | | |
|---|---|---|---|
| 5,487,156 | 1/1996 | Popescu et al. | 395/375 |
| 5,561,776 | 10/1996 | Popescu et al. | 395/375 |
| 5,625,837 | 4/1997 | Popescu et al. | 395/800 |
| 5,628,021 | 5/1997 | Iadonato | 395/800 |
| 5,809,268 | 9/1998 | Chan | 395/376 |

*Primary Examiner*—Eric Coleman
*Attorney, Agent, or Firm*—Stuart T. Langley; William J. Kubida; Holland & Hart LLP

[57] ABSTRACT

A method and apparatus for tracking pipeline resources of a processor involves fetching selected ones of the coded instructions and marking the fetched instructions with instruction metadata. The instruction metadata indicates a number of pipeline resources required by each instruction. The marked instructions are issued from the fetch unit and, using the instruction metadata, a count of a number of resources committed to issued instructions in the execution pipelines is maintained. When it is determined that the number of resources committed to issued instructions exceeds a preselected maximum and instructions are prevented from issuing from the fetch unit. As each instruction is retired, the instruction metadata is used to determine a number of resources released by retirement of the issued instruction.

8 Claims, 3 Drawing Sheets

METHOD FOR TRACKING PIPELINE RESOURCES IN A SUPERSCALAR PROCESSOR

CROSS-REFERENCES TO RELATED APPLICATIONS

The subject matter of the present application is related to that of co-pending U.S. patent application Ser. No. 08/881,958 for AN APPARATUS FOR HANDLING ALIASED FLOATING-POINT REGISTERS IN AN OUT-OF-ORDER PROCESSOR filed concurrently herewith by Ramesh Panwar; Ser. No. 08/881,729 for APPARATUS FOR PRECISE ARCHITECTURAL UPDATE IN AN OUT-OF-ORDER PROCESSOR filed concurrently herewith by Ramesh Panwar and Arjun Prabhu; Ser. No. 08/881,726 for AN APPARATUS FOR NON-INTRUSIVE CACHE FILLS AND HANDLING OF LOAD MISSES filed concurrently herewith by Ramesh Panwar and Ricky C. Hetherington; Ser. No. 08/881,908 for AN APPARATUS FOR HANDLING COMPLEX INSTRUCTIONS IN AN OUT-OF-ORDER PROCESSOR filed concurrently herewith by Ramesh Panwar and Dani Y. Dakhil; Ser. No. 08/882,173 for AN APPARATUS FOR ENFORCING TRUE DEPENDENCIES IN AN OUT-OF-ORDER PROCESSOR filed concurrently herewith by Ramesh Panwar and Dani Y. Dakhil; Ser. No. 08/881,145 for APPARATUS FOR DYNAMICALLY RECONFIGURING A PROCESSOR filed concurrently herewith by Ramesh Panwar and Ricky C. Hetherington; Ser. No. 08/881,732 for APPARATUS FOR ENSURING FAIRNESS OF SHARED EXECUTION RESOURCES AMONGST MULTIPLE PROCESSES EXECUTING ON A SINGLE PROCESSOR filed concurrently herewith by Ramesh Panwar and Joseph I. Chamdani; Ser. No. 08/882,175 for SYSTEM FOR EFFICIENT IMPLEMENTATION OF MULTI-PORTED LOGIC FIFO STRUCTURES IN A PROCESSOR filed concurrently herewith by Ramesh Panwar; Ser. No. 08/882,311 for AN APPARATUS FOR MAINTAINING PROGRAM CORRECTNESS WHILE ALLOWING LOADS TO BE BOOSTED PAST STORES IN AN OUT-OF-ORDER MACHINE filed concurrently herewith by Ramesh Panwar, P. K. Chidambaran and Ricky C. Hetherington; Ser. No. 08/881,731 for APPARATUS FOR TRACKING PIPELINE RESOURCES IN A SUPERSCALAR PROCESSOR filed concurrently herewith by Ramesh Panwar; Ser. No. 08/882,525 for AN APPARATUS FOR RESTRAINING OVER-EAGER LOAD BOOSTING IN AN OUT-OF-ORDER MACHINE filed concurrently herewith by Ramesh Panwar and Ricky C. Hetherington; Ser. No. 08/882,220 for AN APPARATUS FOR HANDLING REGISTER WINDOWS IN AN OUT OF-ORDER PROCESSOR filed concurrently herewith by Ramesh Panwar and Dani Y. Dakhil; Ser. No. 08/881,847 for AN APPARATUS FOR DELIVERING PRECISE TRAPS AND INTERRUPTS IN AN OUT-OF-ORDER PROCESSOR filed concurrently herewith by Ramesh Panwar; Ser. No. 08/881,728 for NON-BLOCKING HIERARCHICAL CACHE THROTTLE filed concurrently herewith by Ricky C. Hetherington and Thomas M. Wicki; Ser. No. 08/881,727 for NON-THRASHABLE NON-BLOCKING HIERARCHICAL CACHE filed concurrently herewith by Ricky C. Hetherington, Sharad Mehrotra and Ramesh Panwar; Ser. No. 08/881,065 for IN-LINE BANK CONFLICT DETECTION AND RESOLUTION IN A MULTI-PORTED NON-BLOCKING CACHE filed concurrently herewith by Ricky C. Hetherington, Sharad Mehrotra and Ramesh Panwar; and Ser. No. 08/882,613 for SYSTEM FOR THERMAL OVERLOAD DETECTION AND PREVENTION FOR AN INTEGRATED CIRCUIT PROCESSOR filed concurrently herewith by Ricky C. Hetherington and Ramesh Panwar, the disclosures of which applications are herein incorporated by this reference.

BACKGROUND OF THE INVENTION

1. Field of the Invention

The present invention relates in general to microprocessors and, more particularly, to a system, method, and microprocessor architecture providing pipeline resource tracking to avoid global pipeline stalls in a high-frequency processor.

2. Relevant Background

Early computer processors (also called microprocessors) included a central processing unit or instruction execution unit that executed only one instruction at a time. As used herein the term processor includes complete instruction set computers (CISC), reduced instruction set computers (RISC) and hybrids. In response to the need for improved performance several techniques have been used to extend the capabilities of these early processors including pipelining, superpipelining, superscaling, speculative instruction execution, and out of-order instruction execution.

Pipelined architectures break the execution of instructions into a number of stages where each stage corresponds to one step in the execution of the instruction. Pipelined designs increase the rate at which instructions can be executed by allowing a new instruction to begin execution before a previous instruction is finished executing. Pipelined architectures have been extended to "superpipelined" or "extended pipeline" architectures where each execution pipeline is broken down into even smaller stages (i.e., microinstruction granularity is increased). Superpipelining increases the number of instructions that can be executed in the pipeline at any given time.

"Superscalar" processors generally refer to a class of microprocessor architectures that include multiple pipelines that process instructions in parallel. Superscalar processors typically execute more than one instruction per clock cycle, on average. Superscalar processors allow parallel instruction execution in two or more instruction execution pipelines. The number of instructions that may be processed is increased due to parallel execution. Each of the execution pipelines may have differing number of stages. Some of the pipelines may be optimized for specialized functions such as integer operations or floating point operations, and in some cases execution pipelines are optimized for processing graphic, ultimedia, or complex math instructions.

The goal of superscalar and superpipeline processors is to execute multiple instructions per cycle (IPC). Instruction-level parallelism (ILP) available in programs written to operate on the processor can be exploited to realize this goal, however, this potential parallelism requires that instructions be dispatched for execution at a sufficient rate. Conditional branching instructions create a problem for instruction fetching because the instruction fetch unit (IFU) cannot know with certainty which instructions to fetch until the conditional branch instruction is resolved. Also, when a branch is detected, the target address of the instructions following the branch must be predicted to supply those instructions for execution.

Recent processor architectures use a branch prediction unit to predict the outcome of branch instructions allowing the fetch unit to fetch subsequent instructions according to the predicted outcome. These instructions are "speculatively executed" to allow the processor to make forward progress during the time the branch instruction is resolved.

In superscalar processors multiple pipelines can simultaneously process instructions only when there are no data dependencies or resource (e.g., register) conflicts between the instructions in each pipeline. Data dependencies cause one or more pipelines to "stall" waiting for the dependent data to become available. This is further complicated in superpipelined processors where, because many instructions are simultaneously in each pipeline, the potential quantity of resource conflicts is large. Greater parallelism and higher performance are achieved by "out-of-order" processors that include multiple pipelines in which instructions are processed in parallel in any efficient order that takes advantage of opportunities for parallel processing that may be provided by the instruction code. However, out-of-order processors require even more resources to perform, for example, instruction scheduling, instruction renaming, execution, register renaming, and retirement functions. These additional resources can each create stalls when the resource is expended.

Prior architectures rely on each functional unit to signal upstream functional units when resources are not available. The upstream units take an appropriate response by, for example, stalling. Although this feedback system effectively throttles the processor when resources are expended, the inter-unit signaling requires additional circuitry and resources. Moreover, each functional unit must include mechanisms for signal generation, signal transmission, signal reception and handling to effectively use the resource tracking information. These mechanisms make the processor design more complex and limit clock frequencies in high-speed processor designs. What is needed is a system, method, and processor architecture that avoids stall conditions while being compatible with high speed design.

SUMMARY OF THE INVENTION

Briefly stated, the present invention a system and method that tracks availability of resources in the entire machine using a single functional unit called pipeline tracking logic that is responsible for opening the gates for the instruction flow from an instruction cache. The pipeline tracking logic tracks the status of all the available resources in the pipeline and shuts the gates for the instruction flow out of the instruction cache. The pipeline tracking logic uses bookkeeping tables that are updated on instruction fetch, pipeline flushes (due to branch mispredictions, traps, and the like), and instruction retirement to monitor the status of the pipeline resources and control the flow of instructions down the pipeline from the instruction cache. This allows the functional units within the execution pipelines to function without global stalls after the instruction cache which is advantageous for high frequency design.

A method for tracking pipeline resources of a processor in accordance with the present invention involves fetching selected ones of the coded instructions and marking the fetched instructions with instruction metadata. The instruction metadata indicates a number of pipeline resources required by each instruction. The marked instructions are issued from the fetch unit and, using the instruction metadata, a count of a number of resources committed to issued instructions in the execution pipelines is maintained. When it is determined that the number of resources committed to issued instructions exceeds a preselected maximum and instructions are prevented from issuing from the fetch unit. As each instruction is retired, the instruction metadata is used to determine a number of resources released by retirement of the issued instruction.

In another aspect, the present invention involves processor that executes coded instructions, the processor including a fetch unit operative to fetch selected ones of the coded instructions. A marker unit within the fetch unit marks the fetched instructions with instruction metadata. The processor includes a floodgate unit having a first state in which marked instructions are passed to the etch unit output and a second state in which marked instructions are held back. A plurality of downstream functional units are coupled to receive and execute instructions from the floodgate unit, each of the functional units having a preselected number of resources available and the instruction metadata indicating the number of the resources required by each instruction. A resource monitor unit responds to the instruction metadata to adjust the count of resources available based upon the number of resources required by each instruction. The resource monitor being coupled to select the state of the floodgate unit. A retirement device within one of the downstream functional units is coupled to the resource monitor unit such that the resource monitor is responsive to the retirement unit to increment the count of available resources as the downstream functional units complete execution of an instruction.

The foregoing and other features, utilities and advantages of the invention will be apparent from the following more particular description of a preferred embodiment of the invention as illustrated in the accompanying drawings.

DETAILED DESCRIPTION OF THE PREFERRED EMBODIMENTS

Figure 1:
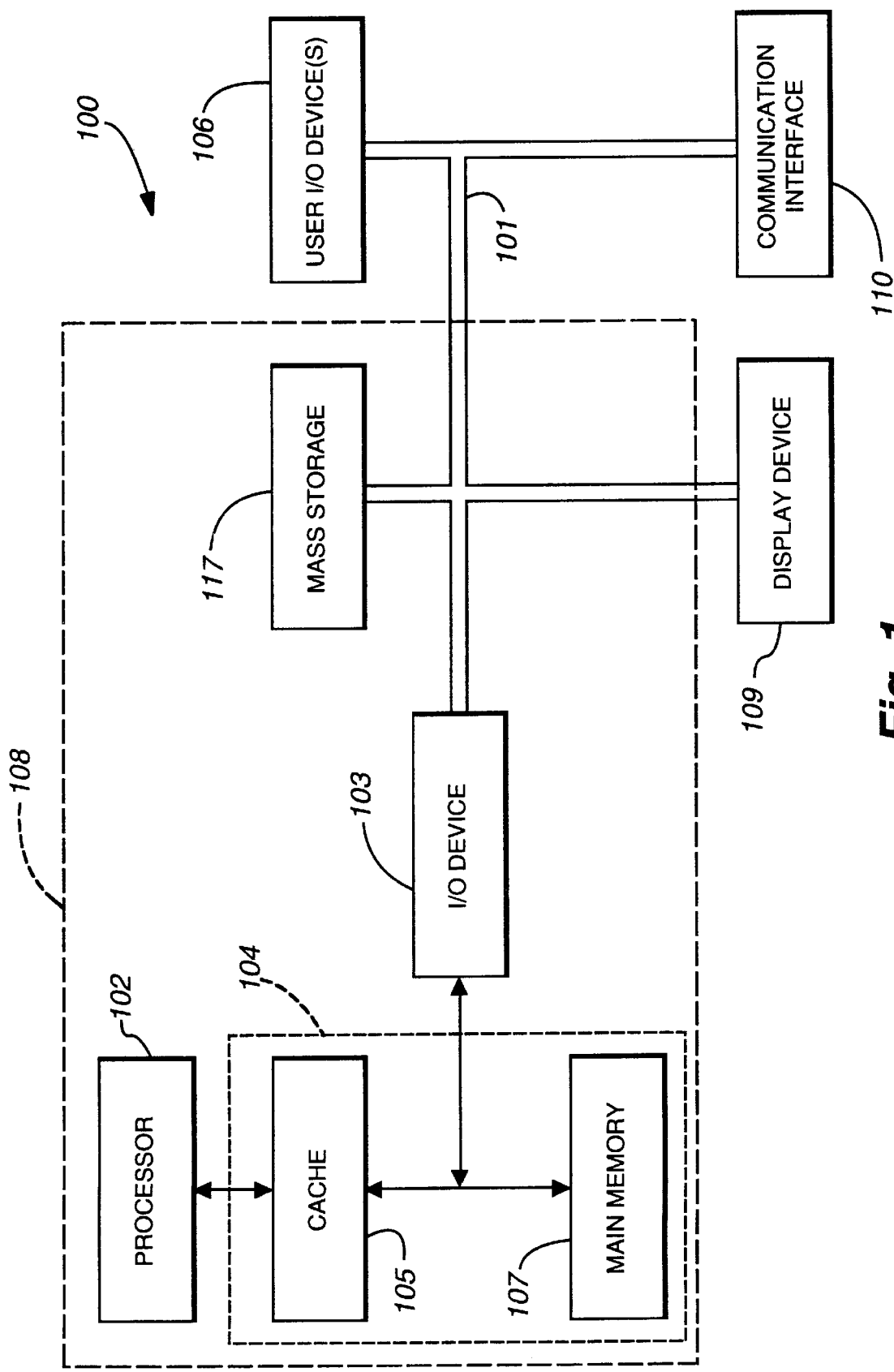
FIG. 1 shows in block diagram form a computer system incorporating an apparatus and system in accordance with the present invention.

Processor architectures can be represented as a collection of interacting functional units as shown in FIG. 1. These functional units, discussed in greater detail below, perform the functions of fetching instructions and data from memory, preprocessing fetched instructions, scheduling instructions to be executed, executing the instructions, managing memory transactions, and interfacing with external circuitry and devices.

Figure 2:
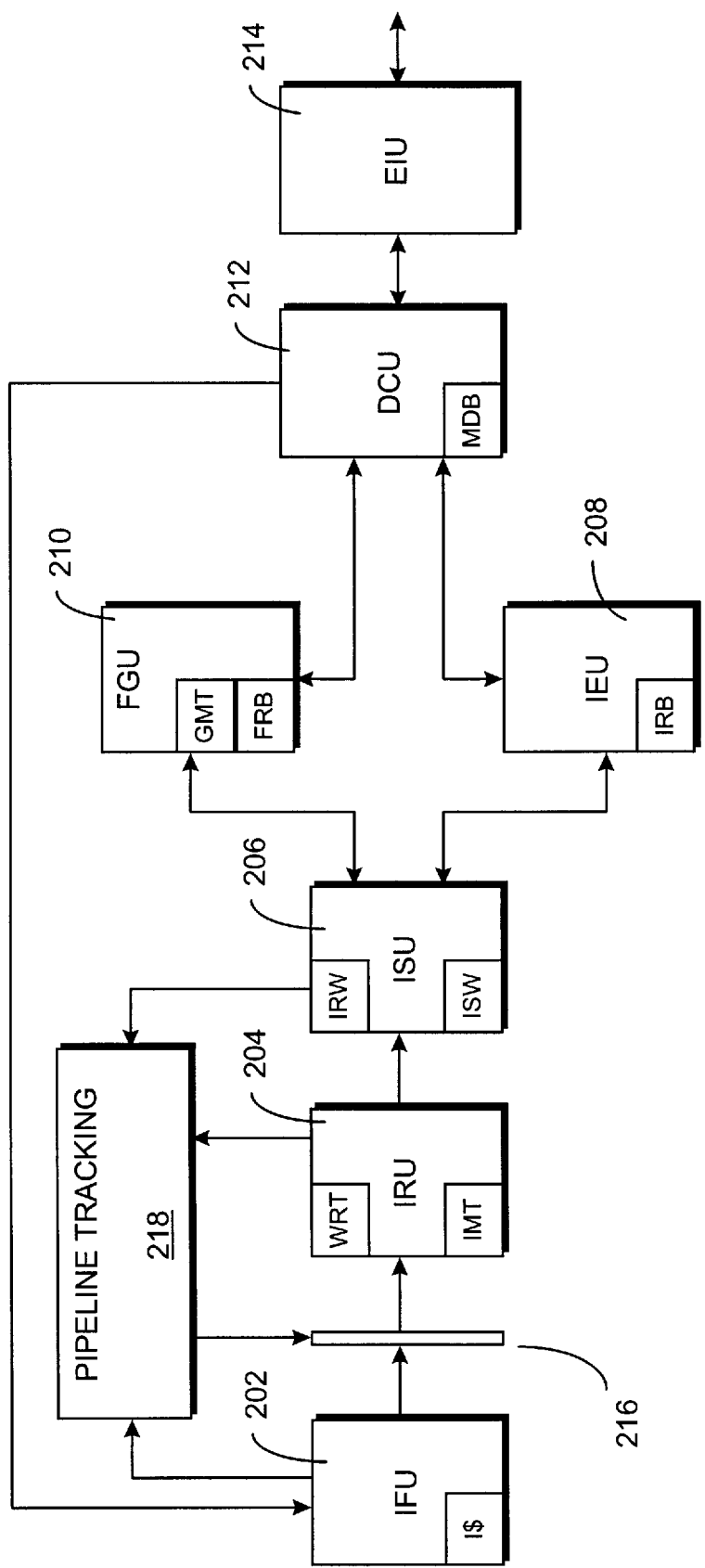
FIG. 2 shows a processor in block diagram form incorporating the apparatus and method in accordance with the present invention.

The present invention is described in terms of apparatus and methods particularly useful in a superpipelined and superscalar processor 102 shown in block diagram form in FIG. 1 and FIG. 2. The particular examples represent implementations useful in high clock frequency operation and processors that issue and executing multiple instructions per cycle (IPC). However, it is expressly understood that the inventive features of the present invention may be usefully embodied in a number of alternative processor architectures that will benefit from the performance features of the present invention. Accordingly, these alternative embodiments are equivalent to the particular embodiments shown and described herein.

FIG. 1 shows a typical general purpose computer system 100 incorporating a processor 102 in accordance with the present invention. Computer system 100 in accordance with the present invention comprises an address/data bus 101 for communicating information, processor 102 coupled with bus 101 through input/output (I/O) device 103 for processing data and executing instructions, and memory system 104 coupled with bus 101 for storing information and instructions for processor 102. Memory system 104 comprises, for example, cache memory 105 and main memory 107. Cache memory 105 includes one or more levels of cache memory. In a typical embodiment, processor 102, I/O device 103, and some or all of cache memory 105 may be integrated in a single integrated circuit, although the specific components and integration density are a matter of design choice selected to meet the needs of a particular application.

User I/O devices 106 are coupled to bus 101 and are operative to communicate information in appropriately structured form to and from the other parts of computer 100. User I/O devices may include a keyboard, mouse, card reader, magnetic or paper tape, magnetic disk, optical disk, or other available input devices, include another computer. Mass storage device 117 is coupled to bus 101 may be implemented using one or more magnetic hard disks, magnetic tapes, CDROMs, large banks of random access memory, or the like. A wide variety of random access and read only memory technologies are available and are equivalent for purposes of the present invention. Mass storage 117 may include computer programs and data stored therein. Some or all of mass storage 117 may be configured to be incorporated as a part of memory system 104.

In a typical computer system 100, processor 102, I/O device 103, memory system 104, and mass storage device 117, are coupled to bus 101 formed on a printed circuit board and integrated into a single housing as suggested by the dashed-line box 108. However, the particular components chosen to be integrated into a single housing is based upon market and design choices. Accordingly, it is expressly understood that fewer or more devices may be incorporated within the housing suggested by dashed line 108.

Display device 109 is used to display messages, data, a graphical or command line user interface, or other communications with the user. Display device 109 may be implemented, for example, by a cathode ray tube (CRT) monitor, liquid crystal display (LCD) or any available equivalent.

FIG. 2 illustrates principle components of processor 102 in greater detail in block diagram form. It is contemplated that processor 102 may be implemented with more or fewer functional components and still benefit from the apparatus and methods of the present invention unless expressly specified herein. Also, functional units are identified using a precise nomenclature for ease of description and understanding, but other nomenclature often is often used to identify equivalent functional units.

Instruction fetch unit (IFU) 202 comprises instruction fetch mechanisms and includes, among other things, an instruction cache for storing instructions, branch prediction logic, and address logic for addressing selected instructions in the instruction cache. The instruction cache is commonly referred to as a portion (I$) of the level one (L1) cache with another portion (D$) of the L1 cache dedicated to data storage. Other cache organizations are known and may be equivalently substituted and such substitutions will result in predictable performance impact. IFU 202 fetches one or more instructions at a time by appropriately addressing the instruction cache.

In accordance with the present invention, IFU 202 includes instruction marker circuitry for analyzing the fetched instructions to determine selected information about the instructions. This selected information is called "instruction metadata" herein and comprises information about, for example, instruction complexity and downstream resources that are required to execute the instruction. The term "execution resources" refers to architectural register space, rename register space, table space, decoding stage resources, and the like that must be committed within processor 102 to execute the instruction. This metadata analysis can be achieved by dedicated combinatorial logic that outputs the metadata in response to the instruction op-code input. Alternatively, a look-up table or content addressable memory can be used to obtain the metadata. In a typical application, the instruction metadata will comprise two to eight bits of information that is associated with each instruction.

Figures 3, 4:
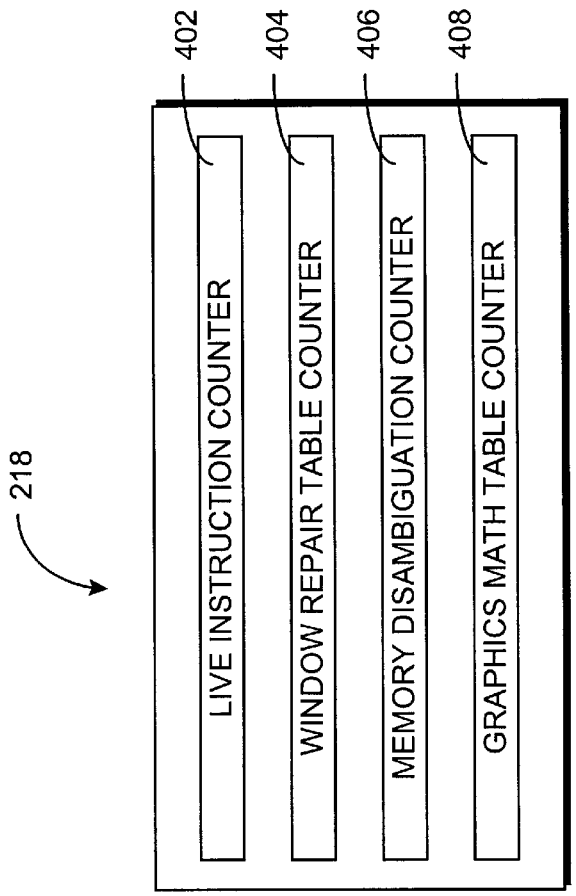
FIG. 3 illustrates an example instruction bundle in accordance with an embodiment of the present invention.
FIG. 4 shows in block diagram form a resource tracking mechanism in accordance with the present invention.

In many applications it is desirable to fetch multiple instructions at one time. For example, four, eight, or more instructions may be fetched simultaneously in a bundle. In accordance with the present invention, each instruction bundle includes the instruction metadata as shown in FIG. 3. I0–I7 represent conventional instruction fields that comprise, for example, an op-code, one or more operand or source register specifiers (typically denoted rs1, rs2, rs3, etc.) and a destination register specifier (typically denoted rd) and/or condition code specifiers. Other information, including instruction metadata, may be included in each I0–I7 field. As shown in FIG. 3, the instruction metadata for an entire bundle may be grouped in a single field labeled MARKERS in FIG. 3. Alternatively, the instruction metadata may be distributed throughout the I0–I7 instruction fields.

IFU 202 issues addressed instructions to instruction rename unit (IRU) 204 through instruction "floodgate" 216. In the absence of conditional branch instruction, IFU 202 addresses the instruction cache sequentially. The branch prediction logic in IFU 202 handles branch instructions, including unconditional branches. An outcome tree of each branch instruction is formed using any of a variety of available branch prediction algorithms and mechanisms. More than one branch can be predicted simultaneously by supplying sufficient branch prediction resources. After the branches are predicted, the address of the predicted branch is applied to the instruction cache rather than the next sequential address.

Floodgate 206 functions as a shutter or gateway that is opened and closed under control of pipeline tracking unit 218. As instruction bundles are fetched, pipeline tracking unit 218 obtains the metadata through IFU 202 or equivalent coupling. Once instructions have passed through floodgate 216 they are considered "live instructions". Pipeline tracking unit 218 operates in cooperation with floodgate 216 to stall instruction issue from IFU 202 so as to throttle or regulate instruction execution in processor 102. The operation of pipeline tracking unit 218 is described in greater detail hereinbelow.

The remaining functional units shown in FIG. 2 are generally referred to as "downstream" functional units although instructions and data flow bidirectionally between the remaining functional units. As described in greater detail below, some or all of the downstream functional units have resource limitations designed into their circuitry. In many instances, a specific number resources are committed for each live instruction. In other instances, a functional unit may have a unique type of resource having a unique resource limit.

A significant advantage in accordance with the present invention is that the downstream functional units do not require individual resource tracking circuitry and stall circuitry on a unit-by unit basis. In other words, all or some of downstream functional units can be made "free running" (i.e., each functional unit running substantially independently of other functional units) because floodgate 216 acts to globally throttle instruction issue when any resource is committed above a preselected level. The preselected level at which floodgate 216 is closed may correspond, for example, to the same number as the number of a particular type of resources that are available. When a resource limit is reached, IFU 202 is prevented from issuing more instructions and the downstream functional units continue to operate unimpaired on the instructions that have already been issued until the resource limitation is removed by instruction retirement or a pipeline flush (i.e., removal of one or more instructions from the execution pipeline in response to branch mispredictions, traps, and the like).

IRU 204 comprises one or more pipeline stages that include instruction renaming and dependency checking mechanisms. IRU 204 further comprises a window repair table (WRT) operative to store status information about register window instructions used to restore the state of register windows after a branch misprediction. The WRT includes thirty-two entries or slots, each entry comprising one or more fields of information in a particular example. The number of entries in the WRT may be more or less depending on the needs of a particular application. The WRT would not be necessary in a processor that does not use register widows.

The a dependency checking mechanism, called an inverse map table (IMT), analyzes the instructions to determine if the operands (identified by the instructions' register specifiers) cannot be determined until another live instruction has completed. A particular embodiment of an IMT is operative to map register specifiers in the instructions to physical register locations and to perform register renaming to prevent dependencies. IRU 204 outputs renamed instructions to instruction scheduling unit (ISU) 206.

Program code may contain complex instructions, also called "macroinstructions", from the running object code. It is desirable in many applications to break these complex instructions into a plurality of simple instructions or "microinstructions" to simplify and expedite execution. In a specific implementation, the execution units are optimized to handle instructions with a limited number of dependencies with each instruction using a limited number of resources. Complex instructions include any instructions that require more than the limited number of resources or involve more than the limited number of dependencies. IRU 204 includes mechanisms to identify complex instructions from the instruction metadata and translate or explode complex instructions into a plurality of microinstructions. These microinstructions are executed more efficiently in the execution units (e.g., floating point and graphics execution unit (FGU) 210 and integer execution unit (IEU)) 208 than could the macroinstructions. Hence, a single complex instruction will require more resources than would a single microinstruction. Pipeline tracking mechanism 218 may use the complex instruction metadata to appropriately account for these extra resource commitments or may interact with IRU 204 to obtain additional data about the number of resources required by the complex instructions after they are exploded.

ISU 206 receives renamed instructions from IRU 204 and registers them for execution by assigning each instruction a position or slot in an instruction scheduling window (ISW). In a specific embodiment, the ISW includes one slot for every live instruction. ISU 206 is operative to schedule and dispatch instructions as soon as their dependencies have been satisfied into an appropriate execution unit (e.g., integer execution unit (IEU) 208, or floating point and graphics unit (FGU) 210). ISU 206 also maintains trap status of live instructions. ISU 206 may perform other functions such as maintaining the correct architectural state of processor 102, including state maintenance when out-of-order instruction processing is used. ISU 206 may include mechanisms to redirect execution appropriately when traps or interrupts occur and to ensure efficient execution of multiple threads where multiple threaded operation is used. Multiple thread operation means that processor 102 is running multiple substantially independent processes simultaneously. Multiple thread operation is consistent with but not required by the present invention.

ISU 206 also operates to retire executed instructions when completed by IEU 208 and FGU 210. ISU assigns each live instruction a position or slot in an instruction retirement window (IRW). In a specific embodiment, the IRSW includes one slot for every live instruction. IsU 206 performs the appropriate updates to architectural register files and condition code registers upon complete execution of an instruction. ISU 206 is responsive to exception conditions and discards or flushes operations being performed on instructions subsequent to an instruction generating an exception in the program order. ISU 206 quickly removes instructions from a mispredicted branch and instructs IFU 202 to fetch from the correct branch. An instruction is retired when it has finished execution and all instructions from which it depends have completed. Upon retirement the instruction's result is written into the appropriate register file and is no longer deemed a "live instruction".

In addition to retirement, one or more instructions can be removed from the execution pipelines by pipeline flushes in response to branch mispredictions, traps, and the like. In the case of a pipeline flush, the resources committed to the flushed instructions are released as in the case of retirement, but any speculative results or state changes caused by the flushed instructions are not committed to architectural registers.

IEU 208 includes one or more pipelines, each pipeline comprising one or more stages that implement integer instructions. IEU 208 also includes an integer result buffer (IRB) for holding the results and state of speculatively executed integer instructions. IRB comprises a hardware-defined number of registers that represent another type of execution resource. In the specific example IRB comprises one register slot for each live instruction. IEU 208 functions to perform final decoding of integer instructions before they are executed on the execution units and to determine operand bypassing amongst instructions in an out-of-order processor. IEU 208 executes all integer instructions including determining correct virtual addresses for load/store instructions. IEU 208 also maintains correct architectural register state for a plurality of integer registers in processor 102. IEU 208 preferably includes mechanisms to access single and/or double precision architectural registers as well as single and/or double precision rename registers.

FGU 210, includes one or more pipelines, each comprising one or more stages that implement floating point instructions. FGU 210 also includes a floating point results buffer (FRB) for holding the results and state of speculatively executed floating point and graphic instructions. The FRB comprises a hardware-defined number of registers that represent another type of execution resource. In the specific example the FRB comprises one register slot for each live instruction. FGU 210 functions to perform final decoding of floating point instructions before they are executed on the execution units and to determine operand bypassing amongst instructions in an out-of-order processor. In the specific example, FGU 210 includes one or more pipelines dedicated to implement special purpose multimedia and graphic instructions that are extensions to standard architectural instructions for a processor. FGU 210 may be equivalently substituted with a floating point unit (FPU) in designs in which special purpose graphic and multimedia instructions are not used. FGU 210 preferably includes mechanisms to access single and/or double precision architectural registers as well as single and/or double precision rename registers.

Optionally, FGU 210 may include a graphics mapping table (GMT) comprising a fixed number of resources primarily or exclusively used for graphics operations. The GMT resources are typically used only for graphics instructions and so will not be committed for each live instruction. In accordance with the present invention, the instruction metadata includes information about whether the fetched instruction requires GMT-type resources.

A data cache memory unit (DCU) 212, including cache memory 105 shown in FIG. 1, functions to cache memory reads from off-chip memory through external interface unit (EIU) 214. Optionally, DCU 212 also caches memory write transactions. DCU 212 comprises one or more hierarchical levels of cache memory and the associated logic to control the cache memory. One or more of the cache levels within DCU 212 may be read only memory to eliminate the logic associated with cache writes. DCU 212 includes a memory disambiguation buffer (MDB) having a fixed number of resources. The MDB resources are primarily or exclusively used for memory operations such as load and store instructions to allow out-of-order issue and execution. In the case of memory operations, the storage location that is the target of the operation is not known until after the instruction is executed. Hence, dependency checking cannot be completely performed. Ambiguities will arise when a younger (i.e., subsequently issued) load instruction is executed before an older store instruction. The MDB essentially functions to bypass data from the older store to the younger load.

In a particular example, the MDB comprises a content addressable memory (CAM) structure having a slot assigned to each instruction corresponding to a memory operation. In typical program code, about 30% of instructions are memory operations and so the MDB does not require a slot for every live instruction. It is contemplated that an effective MDB may have slots for 30% to 60% of the number of live instructions in processor 102. In a particular implementation, MDB comprises a 64 entry CAM where the number of live instructions is 128.

In the specific example of FIG. 2 there are four different types of resources that require tracking. The IMT, IRW, ISW, IRB, and FRB represent a first type in which an equal number of resources are committed for each issued instruction. Hence, a single counter can track all of these resources. In the specific examples, each of these first type resources comprised 128 entries. Accordingly, pipeline tracking unit 218 includes a modulo-128 up-down counter, or the equivalent. Live instruction counter 402 shown in FIG. 4 is initialized with a value of 128 and each time an instruction is issued and assigned a slot in each of the IMT, IRW, ISW, IRB, and FRB, live instruction counter 402 is decremented to reflect a number of resources remaining. Equivalently, live instruction counter 402 could be initialized to any known value and incremented or decremented each time an instruction is issued.

Pipeline tracking unit 218 determines if sufficient live instruction resources remain to issue a further bundle of instructions. When insufficient resources remain, floodgate 216 is closed. After floodgate 216 is closed, the downstream functional units continue to execute and retire or flush instructions, thereby releasing some of the committed resources. The IRW in ISU 206 reports retired and flushed instructions to pipeline tracking unit 218. Pipeline tracking unit 218 responds to notification of a retired or flushed instruction by adjusting live instruction counter 402 to reflect the quantity of resources remaining after the retirement or pipeline flush operation.

As shown in FIG. 4, pipeline tracking unit 218 also includes separate counters for each different resource type in processor 102. For example, WRT counter 404 tracks the available resources in the WRT of IRU 204. MDB counter 406 tracks the available resources in the MDB of DCU 212. Likewise GMT counter 408 tracks the available resources in the GMT of FGU 210. Any number of resources and resource types can be tracked in this manner. It should be noted that four relatively small and efficient counter structures replace some or all of the stall detection mechanisms used in each functional unit of previous architectures. This simplifies the design of each functional unit and can enhance operation speed of the unit. Further, eliminating or minimizing the resource monitoring feedback between functional units allows each functional unit to operate in a free running mode without latency added by steps taken to determine whether a stall condition exists.

While the invention has been particularly shown and described with reference to a preferred embodiment thereof, it will be understood by those skills in the art that various other changes in the form and details may be made without departing from the spirit and scope of the invention. The various embodiments have been described using hardware examples, but the present invention can be readily implemented in software. For example, it is contemplated that a programmable logic device, hardware emulator, software simulator, or the like of sufficient complexity could implement the present invention as a computer program product including a computer usable medium having computer readable code embodied therein for tracking pipeline resources in an emulated or simulated processor. Accordingly, these and other variations are equivalent to the specific implementations and embodiments described herein.

What is claimed is:

1. In a processor that executes coded instructions on one or more execution pipelines, a method for tracking pipeline resources of the processor comprising the steps of:

fetching selected ones of the coded instructions;

marking the fetched instructions with instruction metadata, wherein the instruction metadata indicates a number of pipeline resources required by each instruction;

issuing marked instructions from the fetch unit;

as an instruction is issued from the fetch unit, using the instruction metadata, maintaining a count of a number of resources committed to issued instructions in the execution pipelines;

determining if the number of resources committed to issued instructions exceeds a preselected maximum; and in response to determining that the number of committed resources exceeds the preselected maximum, preventing instructions from issuing from the fetch unit.

2. The method of claim 1 further comprising the step of:

as each instruction is retired, using the instruction metadata to determine a number of resources released by retirement of the issued instruction.

3. The method of claim 1 wherein the step of determining further comprises the steps of:

providing a resource monitor unit with a number of registers available; and comparing the number of registers available with the number of resources committed.

4. The method of claim 1 wherein the execution pipelines include a number of different types of resources and the step of maintaining a count of the number of resources comprises maintaining a count of a number of each type of resource required by each instruction.

5. The method of claim 4 wherein each instruction may require one or more types of resources.

6. The method of claim 1 wherein the execution pipelines include a number of different types of resources and each instruction requires a similar number of a plurality of the different types of resources and the step of maintaining a count of the number of resources comprises maintaining a single count for all of the plurality of the different types of resources.

7. A computer program product comprising:

a computer usable medium having computer readable code embodied therein for tracking pipeline resources in a processor, the computer program product comprising:

computer readable program code devices configured to cause a computer to effect storing codes instructions in an instruction cache;

computer readable program code devices configured to cause a computer to effect fetching selected instructions from the instruction cache;

computer readable program code devices configured to cause a computer to effect marking the fetched instructions with instruction metadata, wherein the instruction metadata indicates a number of resources required to execute each fetched instruction;

computer readable program code devices configured to cause a computer to effect issuing marked instructions from the fetch unit;

computer readable program code devices configured to cause a computer to effect maintaining a count of a number of resources committed to issued instructions using the instruction metadata;

computer readable program code devices configured to cause a computer to effect determining if the number of resources committed to issued instructions exceeds a preselected maximum; and computer readable program code devices configured to cause a computer to effect preventing instructions from issuing in response to determining that the number of committed resources exceeds the preselected maximum.

8. The computer program product of claim 7 further comprising:

computer readable program code devices configured to cause a computer to effect adjusting the count of a number of resources committed using the instruction metadata to account for resources released by retirement of an issued instruction.

* * * * *